United States Patent Office 3,556,583
Patented Jan. 19, 1971

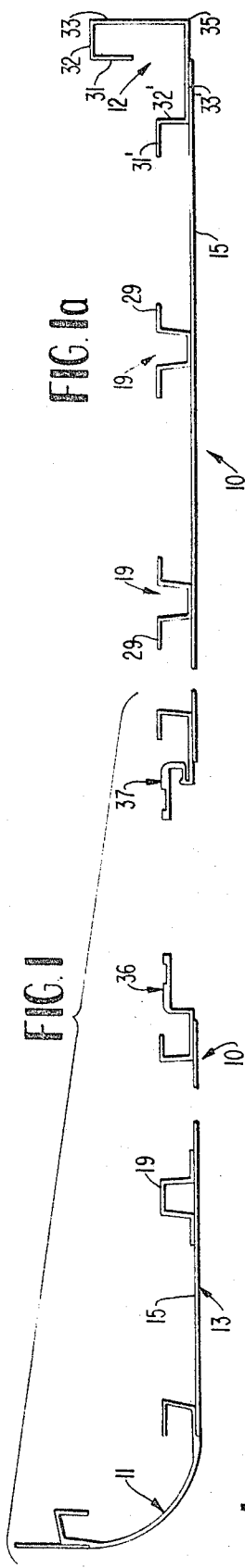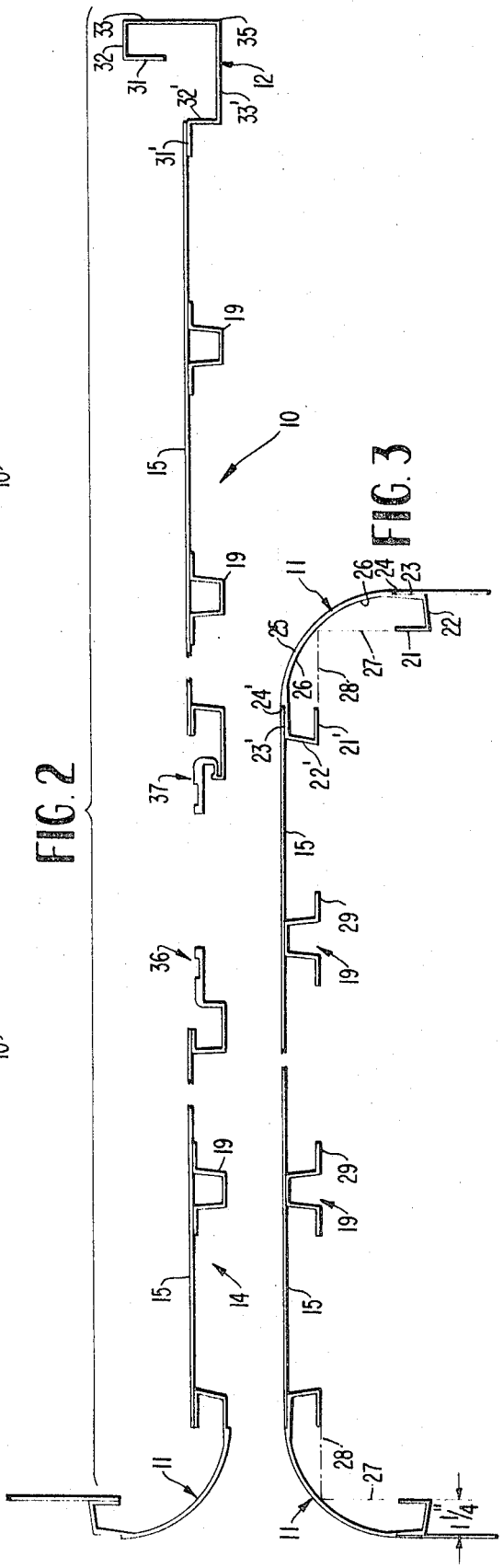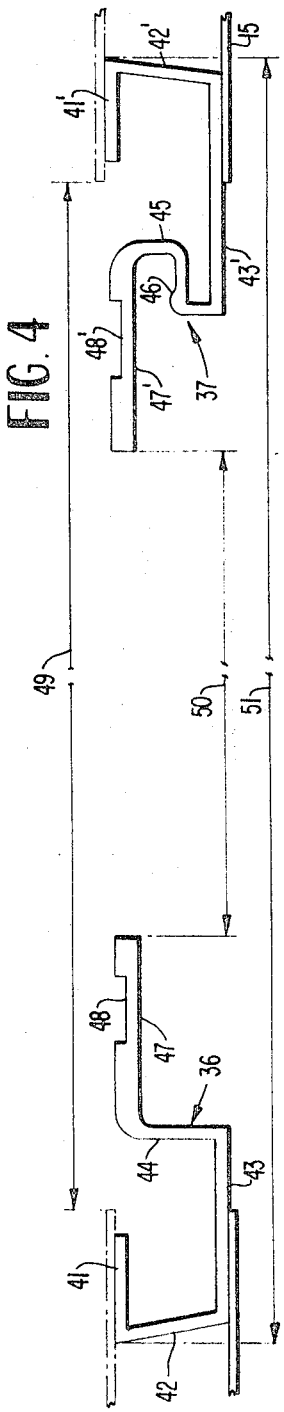

3,556,583
PANEL VEHICLE BODY ASSEMBLY COMPOSED OF REVERSIBLE FRAME AND PANEL ELEMENTS
Jack Ellard, Baltimore, Md., assignor to The Duralite Manufacturing Company, Baltimore, Md., a corporation of Maryland
Filed Aug. 9, 1968, Ser. No. 751,588
Int. Cl. B62d 33/00
U.S. Cl. 296—28                                5 Claims

ABSTRACT OF THE DISCLOSURE

Front and rear corner posts and door assembly members of improved strength to weight ratio are made reversible for use on either left or right side of the vehicle in smooth skin or exposed rib configuration to provide standardized parts each replacing four differing parts.

---

Considerable effort has been directed to providing commercial bodies for trucks and trailer vehicles of the knockdown type formed of prefabricated panel members and others components having some degree of standardization for use in more than one basic body type, or for limited reversibility. However, in prior constructions some elements are not interchangeable for use when reversed. Differing post and frame elements must be stocked for making the left and right sides of the vehicle, resulting in excessive cost of tools, stored stock, and time for body construction. This is particularly true of the front corner post, the rear corner post, and the front and rear frame elements of the door assemblies.

Front and rear corner post members are preferably designed for manufacture by extrusion when a lightweight aluminum body construction is desired. The simplest effective structure is desired but reversibility is also desired to reduce stock and manufacturing costs. At the same time, a smooth or streamlined appearance is desired especially at the front of the vehicle, without sacrifice of any interior space. Full adaptability of a corner post to the four basic uses requires both reversibility and that either a smooth skin appearance or a ribbed appearance be obtained in which exposed ribs, including the corner posts, be of mutually conforming appearance. These features have not heretofore been combined. In addition, it is desired that the strength factor at corners and door assemblies be greatly increased when usual ribbed thin metal panels comprise the vehicle walls. One construction of a wall panel has a skin member to which are attached U-shaped reinforcing ribs extending vertically from the floor to the roof member for attachment to rails of standardized configuration. A number of panels of this construction, often with a side door assembly of like width, form each side wall of the vehicle. The reinforcing rib members of such a panel may be internal to provide a smooth skin exterior along each side one of which is reversed or inverted for use on left and right sides, respectively, or may be reversed or inverted in order to provide a ribbed exterior. Such panels normally include two or more parallel ribs one or both lateral edges being unribbed for attachment to a corner post, door post or second panel. Such a panel member is both reversible for left or right sides and useful in either the smooth skin optionally with insulation between ribs for refrigerated bodies, or having ribbed exterior sides and ends of the body, so that only one style of panel need be manufactured and stocked for all such uses. This standardization has not been available in corner posts and side door assemblies, in any adequate and inexpensive construction.

It is an object of this invention to provide a front post member useful left or right and compatibly conforming to ribbed panels as well as for use in smooth skin configurations.

Other objects are to provide rear post and door assembly post members which are likewise useful without modification for left or right side either in ribbed or smooth skin configurations.

It is also an object of the invention to provide post members of increased strength by extrusion and in which no loss of cargo space accompanies streamlining.

Proceeding now to a description of the invention illustratively shown in the drawings:

FIG. 1 is a plan view according to this invention of one wall of a vehicle body, partly broken away, in a smooth skin arrangement;

FIG. 1a shows ribs inverted with respect to FIG. 1 ribs for use in voidless panel insulation;

FIG. 2 is a plan view as in FIG. 1 but showing a ribbed exterior arrangement made from the same elements;

FIG. 3 is a plan view as in FIG. 1 of the front wall in the smooth skin configuration; and FIG. 4 is a partial plan view as in FIG. 1 but enlarged to show a door post assembly for left or right side of the vehicle.

Standardization is accomplished mainly by careful selection of angular relationships between the flanges and body portions of posts 11, by which exposed edges of the post conform to the rib shape and by forming the two sides of a front corner post alike to be symmetrical with respect to a bisecting plane. Rear posts may be like front posts, but where maximum rear door opening is desired the rear door frame may be combined with the post which is then not curved as is the front post, and exact symmetry is not obtained if access to the post interior is to be provided as in FIGS. 1 and 2. Posts 12, however, are reversible left for right and the side panels are attachable for smooth skin or exposed rib appearance without change of post design. When an insulated panel is desired ribs may be inverted for attachment to skin members as in FIG. 1a, insulation being loose material held in place by an inner skin member (not shown), or may be of rigid material.

A post structure is provided as illustrated in FIGS. 1, 2 and 3 at 11 for a front corner post and at 33 for a rear corner post. Door structure members are provided which are reversible left for right, being composed of framing members for the leading edge of the door as at 36 for the trailing edge of the door as at 37. While the door assembly as a whole cannot be interchanged left for right the individual elements comprising the door member are reversible since each such member 36 when shifted from left to right side merely need to be inverted end for end. Similarly, the trailing edge of the door frame, which includes a latch ridge 46, is invertible end for end to be used either on the left or right side of the vehicle. A door assembly including framing members 36 and 37 includes also roof and floor rails of variable design (not shown) to which opposite ends of members 36 and 37 attach.

Each element 11 is a corner post installable on the left or right by rotating 90° and each element 12 is a post installable at the left or right corner of the vehicle by inverting. Either post 11 or 12 may be a front or a rear corner, preferably two elements 11 holding a front panel and two elements 12 holding rear doors of variable design (not illustrated). When elements 36 and 37 are installed on either side as described and panels at 13 or 14 comprising skin member 15 and one or more ribs 19 or 29 are assembled on posts 11 or 12 with a roof panel and doors (not shown) a rigid body is formed, often insulated to the thickness of the ribs as in panels 14 of FIG. 2.

Referring now particularly to FIG. 3 it will be noted that corner post 11 is constructed of uniform section throughout its length comprising a vertical arcuate member having edge lips or flanges 21, 21' spacer portions 22, 22', second flanges 23, 23', flush skin offsets 24, 24', a 90° arcuate center portion 25 and thickened portions 26, 26', adjacent offsets 24, 24', being preferably formed as a uniform extrusion from an aluminum alloy, or the like.

Lip flanges 21, 21' are formed parallel to the side and end of the vehicle, respectively, as are portions 23, 23' being arranged parallel to 21, 21', respectively, and approximately coextensive therewith to form with spacing portions 22, 22' a generally U-shaped channel which may serve as an effective stiffener to each edge of the arcuate portion 25 of the corner post. By this construction a portion 22 or 22' is dimensioned to separate portion 21 from portion 23 and portion 21' from portion 23' by the thickness desired for body rib, so that a panel having a skin 15 may be placed adjacent either portions 23, 23' or the inner lip portions 21, 21'. Inner lip portions 21, 21' are mutually at right angles, and the curvature of the arcuate portion 25 is preferably arranged in conjunction with the width of spacer portions 22, 22' such that projections of the planes along lips 21, 21' meet approximately at the inner surface of the arcuate portion 25. Constructed in this way a corner post is given a pleasing exterior of rounded or streamlined effect without decreasing the loading space, which is generally confined to the area within a plane common to the ribs and inner flange members of the corner posts.

A side or end panel skin attached along lips 21, 21' leaves exposed the spacing portions 22, 22' to have faces of flange portions 23, 23' arranged parallel to the skin at lips 21, 21'. Spacing members 22, 22' are arranged with an acute angle at the junction with lips 21, 21' and an obtuse angle at a junction with face portions 23, 23', this departure from perpendicularity being approximately the same as that of conventional rib members. The angle employed at the junction of lips 21 and spacing 22 is preferably 75–85° whereas the angle between spacing portion 22 and flange face 23 is the complement of that angle, being therefore 95°–105°. In this construction the configuration comprising 21, 22, 23, 24, and 26 is entirely similar to the configuration of 21', 22', 23', 24', and 26' and symmetrical with respect to a plane bisecting the arcuate portion 25, taken along the length of the post. According to a preferred embodiment the front corner post has lateral dimensions for portions 21, 22 and 23 approximately 1.25 inches to form a highly stiffened post 11 having an effective edge thickness of about 1.25 inches.

Flanges 21, 21' may be referred to as lip portions whereas portions 22, 22' are spacing portions connecting lips 21, 21' with faces 23, 23' in a manner to form in-facing U-channels at respective lateral edges of the post. These U-channels provide edges for the posts on either side having substantially the stiffness and strength of a box beam and presenting a stiff closed edge of neat construction not easily damaged by freight handled in the vehicle. While the portion 25 shown as arcuate in FIG. 3 is suitable for use at the front of the vehicle it will of course be recognized that the arcuate portion may be modified to an angular junction of 90° corresponding to an L-beam when seen in section but with the thickened and strengthened edges comprising the U-channels along either edge of the L-beam.

A structure as shown in FIGS. 1a and 2 may have a rectangular corner appearance, as may be prepared for certain purposes either at the front or the rear of the vehicle, and includes stiffening portions 31, 32, 33 corresponding to portions 21, 22 and 23 of FIG. 3. However, at 31', 32' and 33' a change has been made in the angle between 32' and 31', in order to open the interior of the post member for access, by turning 31' outwardly from the center of the post rather than inwardly as in the case of 31. In this form the post is not wholly symmetrical about a plane bisecting the post at corner 35, but retains other advantages of reversibility and strength. Since portions 31, 32 and 33 form an exposed edge, as at the rear door, and 31', 32' and 33' are for use in attachment of the side panel or front end panel the advantages of the construction shown in FIG. 3 are largely obtained in a post member of smaller dimensions.

Interior faces are provided at mutually perpendicular orientations in each post at 21, 21' and 32, 32', whether the free edge of the lip portions is at an angle to extend toward the post center or away from the same. In either case face and lip portions are provided for receiving sheet 15 with ribs 29 exterior thereof as in FIG. 2 or interior thereof as in FIG. 1. The post structure comprises at least one U-channel stiffener for the outer edge and preferably two such channels except when space limitations may prevent.

FIG. 4 illustrates reversible door assembly elements 36 and 37 comprising lip portions 41, 41', spacer portions 42, 42', face portions 43, 43', and additional elements 44, 45 and 46 which are also spacing and stiffening members for the U-channels comprising 41, 42, 43 and 41', 42' and 43' while providing portions 47, 47' parallel to lips 41, 41', preferably having cutaway portions 48, 48' for attachment of door hanging fixtures. Spacer portions 42, 42' are preferably disposed at an angle corresponding to portions 22, 22' so as to present a beveled rib appearance similar to the beveled sides of ribs 29 when the body is assembled in the exposed rib configuration. In FIG. 4 frame member 37 includes a spacer 45 similar to spacer 44 of element 36 except that 45 is formed with an intermediate portion parallel to 43' at the edge of which is a beam 46 suitable for receiving and retaining a locking mechanism ordinarily associated with a truck door for highway use.

It will be seen that a door frame may be constructed to occupy the space between two side panels illustrated at 49 including an overlap with adjacent panel skins 15 at each side of the door frame to provide a door clearance shown at 50 of but little reduction from the spacing 49. The overall dimension of a door assembly shown at 51 may be maintained by a floor and roof rail framing the doorway in any conventional manner (not shown) in which the elements 36 and 27 are interchangeable left for right by inverting as the same are transferred from one to the other side. Since it is desirable that a truck door be hinged at the leading edge, element 36 carries the hinge attached to portion 47 as at 48 and member 36 is always installed forward of 37 for either the left or right side of the vehicle. Portion 47' comprises the closure stop for the trailing edge of the door and the relieved or cutaway portion 48' serves for attachment of additional hardware such as lock fixtures and attachment means for upper and lower frame members.

While the invention has been described in respect to a preferred embodiment it will be understood that it can be otherwise embodied and is not limited in scope to the illustrated form.

What is claimed is:

1. In a truck body construction including vertical end and side panels having rib members of generally U-shape bonded to sheet members to form ribbed and smooth planar panel surfaces and having non-ribbed vertical edges, a vertical corner post of shaped thin section portions symmetrical about a bisecting plane for interchangeable use on either side of said body, comprising a pair of rectangular planar lip portions arranged mutually perpendicular for supporting planar contact with edges of an end and side panel, respectively, said lip portions having free edges extending toward said plane, a pair of outwardly extending rectangular spacing portions integrally joined throughout the post length to said lip members, at the respective edges thereof opposite said free edges, said spacing portions having vertical outer edges for junction with a body portion, and a body portion integrally connecting said outer edges, said body portion including an arcuate bend approximately 45° each side of said plane throughout the body length to provide a 90° corner, said body portion including plane face portions parallel, respectively, to said lip portions, said face, spacing and lip portions forming a U-channel edge reinforcing structure for said body portion having parallel inner and outer pairs of faces for supporting said end and side panels along said non-ribbed edges in either ribbed or smooth exterior configuration.

2. In a truck body construction including vertical end and side panels having rib members of generally U-shape bonded to sheet members to form ribbed and smooth planar panel surfaces and having non-ribbed vertical edges,
   a vertical corner post of uniform thin section metal portions throughout the post length, comprising
   a pair of rectangular planar lip portions arranged mutually perpendicular for supporting planar contact with edges of an end and side panel, respectively, said lip portions having free vertical edges,
   a pair of outwardly extending rectangular spacing portions integrally joined to said lip members at the respective edges thereof opposite said free edges, said spacing portions having vertical outer edges for junction with a body portion, and
   a body portion integrally connecting said outer edges, said body portion including a 90° arcuate exterior corner having laterally therefrom at the junctions with said spacing portions plane face portions parallel respectively, to said lip portions, said face portions forming receiving faces for said panels.

3. In a vehicle body construction having top, front and side panels, said front and side panels being of sheet metal reinforced by vertical ribs secured thereto at intervals along the width of the panels, a front corner post for receiving a side joint therewith, comprising
   a first inner lip formed as a planar flange extending parallel with a front panel and having a free edge extending in the direction of the center of the post,
   a second inner lip formed as a planar flange extending parallel with a side panel and having a free edge extending in the direction of the center post,
   a connecting spacer portion integral with each said lip extending outwardly from each said lip and thence parallel thereto forming generally U-shaped channels with parallel edges, and
   a corner portion integrally formed with said connecting portions as a continuation of respective outer legs of said U-shaped channels, including vertical corner portions disposed at substantially 90° to each other to align said sides of said U-channels with front and side panels, respectively, of said body, including at the junction of said corner portion with each said connecting channel portion a face comprising said outer legs of the U-shaped channels, said faces being uniformly recessed by substantially the thickness of a skin portion of side and end panels selected for attachment to said corner portion to provide a flush surface.

4. A corner post according to claim 3, said angle at the lip junction being substantially in the range of 95°–105° and said supplementary angle being substantially in the range of 85°–75°, thereby to correspond in exposed outline to a trapezoidal form of said vertical ribs reinforcing said panels such that the corner post exposed edge has the appearance as an edge of a reinforcing rib.

5. In a knock-down truck body construction for utilizing standardized post and panels interchangeable as between left and right sides,
   a pair of symmetrically formed front corner posts each comprising
      a vertical body portion of arcuate exterior form including planar panel receiving faces at 90° horizontally relative orientations parallel, respectively, to a side and front body surface,
      an integrally formed extension for each of said faces turned inwardly relative to the truck body to form a stiffening thickness, and further turned to form a U-channel terminating in vertical planar portions parallel, respectively, to said surfaces recessed for receiving thereon plane surface portions of said panels in exteriorly flush relationship,
   a pair of symmetrically formed rear corner posts each comprising
      a vertical body portion including L-section exterior corner, planar receiving faces parallel, respectively, to a side and a rear body surface, and
   a plurality of planar panels comprising sheeting reinforced by attached vertical ribs on one face intermediate lateral edges thereof for assembly on the inner said planar post portions with said ribs exposed and for reversed assembly on the outer said planar receiving faces with said ribs disposed on the inner faces of said sheeting.

References Cited

UNITED STATES PATENTS

| | | | |
|---|---|---|---|
| 2,457,842 | 1/1949 | Smith et al. | 220—1.5 |
| 2,489,670 | 11/1949 | Powell | 296—28(.2) |
| 2,634,494 | 4/1953 | Powers | 52—282X |
| 2,812,973 | 11/1957 | Pritchard | 296—28(.2) |
| 2,991,116 | 7/1961 | Andrews | 296—28(.2) |
| 3,091,493 | 5/1963 | Rivers | 296—28(.2) |

FOREIGN PATENTS

| | | | |
|---|---|---|---|
| 972,550 | 10/1964 | Great Britain | 296—28(.2) |

BENJAMIN HERSH, Primary Examiner

J. A. PEKAR, Assistant Examiner

U.S. Cl. X.R.

52—282, 288